United States Patent
Li

(10) Patent No.: US 8,983,241 B2
(45) Date of Patent: Mar. 17, 2015

(54) OPTICAL WAVEGUIDE SWITCH

(76) Inventor: Bing Li, Shanghai (CN)

( * ) Notice: Subject to any disclaimer, the term of this patent is extended or adjusted under 35 U.S.C. 154(b) by 155 days.

(21) Appl. No.: 13/996,450

(22) PCT Filed: Dec. 22, 2011

(86) PCT No.: PCT/CN2011/084423
§ 371 (c)(1), (2), (4) Date: Jun. 20, 2013

(87) PCT Pub. No.: WO2012/083864
PCT Pub. Date: Jun. 28, 2012

(65) Prior Publication Data
US 2013/0266257 A1    Oct. 10, 2013

Related U.S. Application Data

(60) Provisional application No. 61/426,400, filed on Dec. 22, 2010.

(51) Int. Cl.
*G02B 6/35* (2006.01)
*G02F 1/025* (2006.01)
*G02F 1/313* (2006.01)
(Continued)

(52) U.S. Cl.
CPC *G02B 6/35* (2013.01); *G02F 1/025* (2013.01); *G02B 2006/12159* (2013.01); *G02F 2001/212* (2013.01); *G02B 2006/12145* (2013.01);
(Continued)

(58) Field of Classification Search
CPC . G02F 1/025; G02F 1/2257; G02F 2001/212; G02B 2006/12142; G02B 2006/12145; G02B 2006/12159

USPC .................................................. 359/276, 279
See application file for complete search history.

(56) References Cited

U.S. PATENT DOCUMENTS

| 4,758,531 A | 7/1988 | Beyer et al. |
| 4,929,302 A | 5/1990 | Valette |

(Continued)

FOREIGN PATENT DOCUMENTS

| CN | 1411197 | 4/2003 |
| CN | 1512207 | 7/2004 |

(Continued)

OTHER PUBLICATIONS

Lui et al., "High-quality single-crystal Ge on insulator by liquid-phase epitaxy on Si substrates", Appl. Phys. Lett. vol. 84, No. 14, 2563, Apr. 5, 2004.

(Continued)

*Primary Examiner* — Jerry Rahll
(74) *Attorney, Agent, or Firm* — Vidas, Arrett & Steinkraus, P.A.

(57) ABSTRACT

Techniques are described to form an optical waveguide switch that could reach a very high extinction ratio. In particular, this disclosure describes an asymmetric MZI, in which different waveguide capacitor structures are used in two arms of the MZI: a first arm with a waveguide capacitor to achieve the mainly phase modulation and a second arm with a waveguide capacitor to achieve mainly the magnitude modulation, respectively. Using the asymmetric MZI in accordance with this disclosure, one can design an algorithm to achieve almost unlimited extinction ration during the switching operation.

9 Claims, 2 Drawing Sheets

(51) Int. Cl.
*G02F 1/225* (2006.01)
*G02B 6/12* (2006.01)
*G02F 1/21* (2006.01)

(52) U.S. Cl.
CPC .... *G02B2006/12142* (2013.01); *G02F 1/3136* (2013.01); *G02F 1/2257* (2013.01)
USPC .............................. 385/3; 359/276; 359/279

(56) References Cited

U.S. PATENT DOCUMENTS

| | | | |
|---|---|---|---|
| 4,932,032 A | 6/1990 | Koch et al. | |
| 5,078,516 A | 1/1992 | Kapon et al. | |
| 5,220,296 A | 6/1993 | von Flotow et al. | |
| 5,285,514 A | 2/1994 | Nojiri et al. | |
| 5,355,422 A | 10/1994 | Sullivan et al. | |
| 5,814,564 A | 9/1998 | Yao et al. | |
| 5,963,688 A | 10/1999 | Campi et al. | |
| 6,195,481 B1 | 2/2001 | Nakajima et al. | |
| 6,278,820 B1 | 8/2001 | Hayes | |
| 6,434,303 B1 | 8/2002 | Temkin et al. | |
| 6,478,873 B1 | 11/2002 | Cheong et al. | |
| 6,541,355 B2 | 4/2003 | Joo et al. | |
| 6,654,729 B1 | 11/2003 | Hickman et al. | |
| 6,749,893 B2 | 6/2004 | Ouellet et al. | |
| 6,819,839 B2 | 11/2004 | Zheng et al. | |
| 6,825,542 B2 | 11/2004 | Lam et al. | |
| 6,870,152 B2 | 3/2005 | Ralph et al. | |
| 6,956,983 B2 | 10/2005 | Morse | |
| 6,991,892 B2 | 1/2006 | Block | |
| 6,999,670 B1 | 2/2006 | Gunn, III et al. | |
| 7,010,208 B1 | 3/2006 | Gunn, III et al. | |
| 7,016,587 B2 | 3/2006 | Kubby et al. | |
| 7,037,793 B2 | 5/2006 | Chien et al. | |
| 7,049,218 B2 | 5/2006 | Choi et al. | |
| 7,065,272 B2 | 6/2006 | Taillaert et al. | |
| 7,065,273 B2 | 6/2006 | Bhowmik et al. | |
| 7,068,885 B2 | 6/2006 | Bidnyk et al. | |
| 7,088,890 B2 | 8/2006 | Liu | |
| 7,120,350 B2 | 10/2006 | Block et al. | |
| 7,136,544 B1 | 11/2006 | Gunn, III et al. | |
| 7,149,387 B2 | 12/2006 | Balakrishnan et al. | |
| 7,263,244 B2 | 8/2007 | Tanaka et al. | |
| 7,289,698 B2 | 10/2007 | Deliwala | |
| 7,352,926 B2 | 4/2008 | Spoonhower et al. | |
| 7,418,166 B1 | 8/2008 | Kapur et al. | |
| 7,453,132 B1 | 11/2008 | Gunn, III et al. | |
| 7,474,973 B2 | 1/2009 | Goodwin | |
| 7,483,455 B2 | 1/2009 | Hattori | |
| 7,499,620 B2 | 3/2009 | Patel et al. | |
| 7,539,373 B1 | 5/2009 | Logvin et al. | |
| 7,570,365 B2 | 8/2009 | Trifonov et al. | |
| 7,668,416 B2 | 2/2010 | Li | |
| 7,807,523 B2 | 10/2010 | Liu et al. | |
| 7,817,881 B2 | 10/2010 | Li | |
| 7,978,941 B2 | 7/2011 | Li | |
| 7,991,249 B2 | 8/2011 | Li | |
| 8,078,020 B2 | 12/2011 | Rasras | |
| 8,148,265 B2 | 4/2012 | Carothers et al. | |
| 2001/0019644 A1 | 9/2001 | Nara et al. | |
| 2002/0110309 A1 | 8/2002 | Devaux et al. | |
| 2002/0159684 A1 | 10/2002 | Sun et al. | |
| 2002/0197016 A1 | 12/2002 | Chandrasekhar et al. | |
| 2003/0052082 A1 | 3/2003 | Khan et al. | |
| 2003/0108294 A1 | 6/2003 | Zheng | |
| 2004/0208421 A1 | 10/2004 | Kitagawa | |
| 2005/0053349 A1 | 3/2005 | Park et al. | |
| 2005/0123242 A1 | 6/2005 | Walker et al. | |
| 2006/0008223 A1 | 1/2006 | Gunn, III et al. | |
| 2006/0110113 A1 | 5/2006 | Park et al. | |
| 2006/0165341 A1 | 7/2006 | Yan et al. | |
| 2007/0104411 A1 | 5/2007 | Ahn et al. | |
| 2007/0116398 A1 | 5/2007 | Pan et al. | |
| 2007/0189688 A1 | 8/2007 | Dehlinger et al. | |
| 2007/0230854 A1 | 10/2007 | Felix Keil | |
| 2007/0292073 A1 | 12/2007 | Li | |
| 2008/0002928 A1 | 1/2008 | Li | |
| 2008/0088354 A1 | 4/2008 | Mosinskis | |
| 2009/0003841 A1* | 1/2009 | Ghidini et al. ............... 398/186 |
| 2009/0324164 A1 | 12/2009 | Reshotko et al. | |
| 2011/0123153 A1 | 5/2011 | Nara | |

FOREIGN PATENT DOCUMENTS

| | | |
|---|---|---|
| CN | 101251559 | 8/2008 |
| CN | 101320111 | 12/2008 |
| EP | 0777139 | 6/1997 |
| JP | 11248949 | 9/1999 |
| JP | 2000131541 | 5/2000 |
| JP | 2009198594 | 9/2009 |

OTHER PUBLICATIONS

Assefa, Solomon et al, CMOS-integrated high-speed MSM germanium waveguide photodetector, Optics Express, Mar. 1, 2010, vol. 18, No. 5, pp. 4986-4999.

Fang, Q. et al, Low Loss (~6.45dB/cm) Sub-Micron Polycrystalline Silicon Waveguide Integrated with Efficient SiON Waveguide Coupler, Optics Express, Apr. 28, 2008, vol. 16, No. 9, pp. 6425-6432.

Beiju et al., "A High-Performance Silicon Electro-Optic Phase Modulator with a Triple MOS Capacitor," Chinese Journal of Semiconductors, vol. 27, No. 12, Dec. 2006, pp. 2089-2093.

Liao et al., "High speed silicon Mach-Zehnder modulator," Optics Express, vol. 13, No. 8, Apr. 18, 2005, pp. 3129-3135.

Liu et al., "Recent advances in high speed silicon optical modulator," Proc. of SPIE vol. 6477, (2007), pp. 1-9.

* cited by examiner

_US 8,983,241 B2_

OPTICAL WAVEGUIDE SWITCH

This application is a national stage application of PCT Application No. PCT/CN2011/084423, filed on Dec. 22, 2011, which claims the benefit of U.S. Provisional Application No. 61/426,400, entitled "High extinction ratio optical waveguide switch using asymmetric Mach-Zehnder interferometer," by Bing Li, and filed on Dec. 22, 2010, the entire content of which is incorporated herein by reference.

TECHNICAL FIELD

The disclosure relates to optical waveguide switches in general and, more particularly, to waveguide switches utilizing Mach-Zehnder interferometers.

BACKGROUND

It is a common technology to use Mach-Zehnder interferometer (MZI) to construct an optical waveguide switch or modulator. In U.S. Pat. No. 7,817,881, the waveguide capacitor concept is introduced in which the free carriers can be stored inside the waveguide core in order to modulate the refractive index of the material.

In silicon photonics, the free-carrier dispersion effect is used to modulate the refractive index of the silicon, and then, produces a switch or amplitude modulation through the MZI. However, in the free-carrier dispersion effect, the injected free carrier affects not only the real part of the refractive index, but also the imaginary part of the index, i.e., it will cause the attenuation of the light while it modulates the phase. As a result, optical switches of the MZI type can not reach a very high extinction ratio due to the fact that the two light beams from two arms of the MZI will have the different power level when they interfere.

SUMMARY

In general, this disclosure describes an optical waveguide switch that could reach a very high extinction ratio. It should be noted that the optical waveguide switch disclosed here shall be constructed by semiconductor material. In particular, this disclosure describes an asymmetric MZI, in which different waveguide capacitor structures are used in two arms of the MZI: one arm with a waveguide capacitor in which the free carriers have small mobility and therefore magnitude modulation is much greater than the phase modulation, and the other arm with a waveguide capacitor in which the free carriers have large mobility and therefore the phase modulation is much greater than the magnitude modulation, respectively. Using the asymmetric MZI in accordance with this disclosure, one can design an algorithm to achieve almost unlimited extinction ratio during the switching operation.

In one embodiment, the optical waveguide switch comprises an asymmetric MZI, wherein one arm comprises an abrupt PN junction and the other arm has a PIN junction. One can intentionally increase the background ion implant density with the net implant density fixed, by applying implants with reversed tone (P or N) alternatively and making them overlap to each other. In this manner, a very high extinction ratio could be achieved.

In another embodiment, this disclosure is directed to an optical waveguide switch using an asymmetric MZI including a waveguide capacitor on each arm. The waveguide capacitor is a ridge-loaded waveguide capacitor structure that is constructed by loading a semiconductor film on top of a regular ridge waveguide. On one arm, which can be referred as the magnitude-modulation arm, the loaded semiconductor film and the silicon ridge of the waveguide capacitor will be heavily doped (background ion density is high but not the net doping density), while they are lightly doped on the other arm, the phase modulation arm.

In another embodiment, this disclosure is directed to an optical waveguide switch using an MZI including two waveguide capacitors on each arm. Each arm of the MZI has both phase section and magnitude section. The phase section comprises a waveguide capacitor with lightly doped loaded semiconductor film and silicon ridge. The magnitude section comprises a waveguide capacitor with heavily doped loaded semiconductor film and silicon ridge.

The details of one or more aspects of the disclosure are set forth in the accompanying drawings and the description below. Other features, objects, and advantages will be apparent from the description and drawings, and from the claims.

DETAILED DESCRIPTION

This disclosure describes an optical waveguide switch using asymmetric MZI to achieve a high extinction ratio, in which different waveguide capacitor structures are used in two arms of the MZI: one arm with a waveguide capacitor in which the background ion density is high to achieve the mainly magnitude modulation and the other arm with a waveguide capacitor in which the background ion density is low to achieve mainly the phase modulation, respectively. It should be noted that the optical waveguide switch disclosed here shall be constructed by semiconductor material. Two particular waveguide capacitors having these properties are the PN junction built in a waveguide and PIN junction built in a waveguide. The PN junction has higher background-ion density and the PIN junction has lower background-ion density. Here, the said "higher" or "lower" is relative to each other, i.e., the one is higher than the other and then the other is lower.

Figure 1:
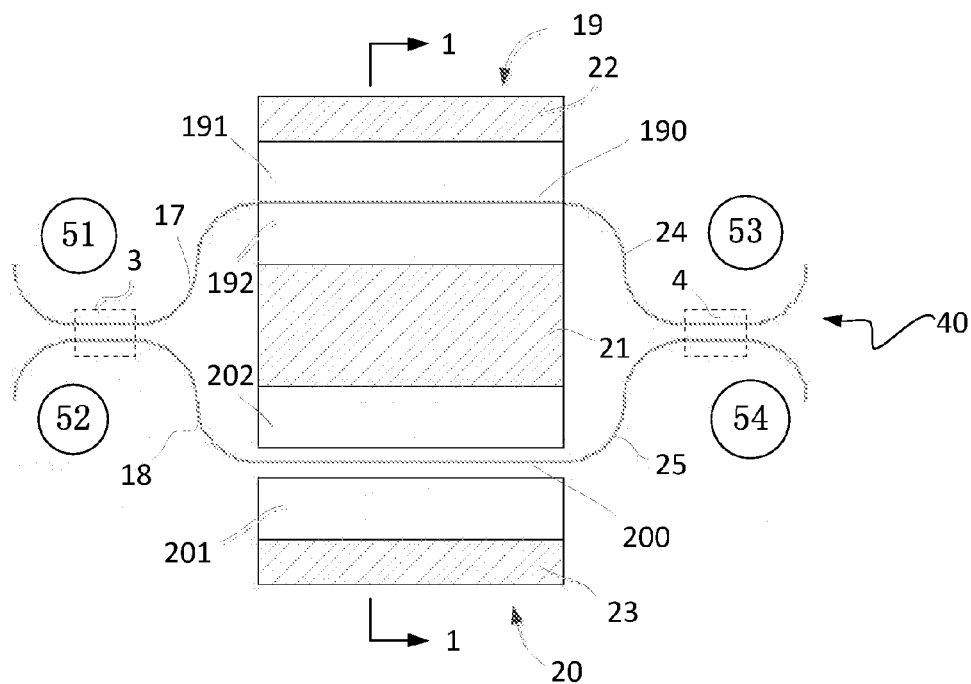
FIG. 1 is a simplified diagram of a top view depicting one example configuration of an optical waveguide switch in accordance with this disclosure.

FIG. 1 is a simplified diagram of a top view depicting one example configuration of an optical waveguide switch in accordance with this disclosure. As shown in FIG. 1, in one embodiment, from the input end to the output end, an optical waveguide switch 40 comprises two input ports 51, 52, a pair of input silicon waveguides 17, 18, input 3-dB coupler 3 coupling the waveguides 17, 18, two arms 19, 20, a pair of output silicon waveguides 24, 25, output 3-dB coupler 4 coupling the waveguides 24, 25 and output ports 53, 54. Arm 19 comprises an abrupt PN junction 190. Arm 20 comprises a PIN junction 200. Magnitude modulation electrode 22 is located over the P doping area 191 of the abrupt PN junction 190 of arm 19, while phase modulation electrode 23 is built over the P doping area 201 of the PIN junction 200 of arm 20.

GND electrode 21 covers a portion of the N doping areas 192, 202 of both the abrupt PN junction 190 and the PIN junction 200.

The difference between the abrupt PN junction 190 and the PIN junction 200 is the background ion implant density. According to the free-carrier dispersion theory, $$\Delta\alpha = \frac{e^3\lambda^2}{4\pi^2c^3\varepsilon_0 n}\left(\frac{\Delta N_e}{\mu_e(m_e^*)^2} + \frac{\Delta N_h}{\mu_h(m_h^*)^2}\right) \quad (1)$$

$$\Delta n = \frac{-e^2\lambda^2}{8\pi^2c^2\varepsilon_0 n}\left(\frac{\Delta N_e}{m_e^*} + \frac{\Delta N_h}{m_h^*}\right) \quad (2)$$

Where, $\Delta\alpha$ represents the imaginary part of index modulation (corresponding to the attenuation), and $\Delta n$ is the real part of the index modulation. One will notice that the imaginary part of the index modulation is related to the mobility of the carriers ($\mu$) while the real part of the index modulation (produce the phase shift) is irrelevant to the mobility. And the mobility of the free carriers inside silicon could be derived by the expression (3).

$$\mu = \mu_{min} + \frac{\mu_{max} - \mu_{min}}{1 + \left(\frac{N_s}{N_r}\right)\eta} \quad (3)$$

As seen in the expression (3), $\mu$ varies with the background ion implant $N_s$. In the abrupt PN junction, the volume where the carrier injection takes place has either P-type or N-type doping, versus that, in PIN junction, the volume where the carrier is injected is intrinsic originally (i.e., there is no background ion density). Therefore, the PIN junction will have more $\Delta n$ and less $\Delta\alpha$, comparing to the PN junction, in which, when the background implant density is very high, the $\Delta\alpha$ (the magnitude modulation) will be much more significant than $\Delta n$ (the phase modulation).

In particular, one can intentionally increase the background ion implant density with the net implant density fixed, by applying implants with reversed tone (P or N) alternatively and making them overlap to each other. So, the PN junction designed and fabricated in such way will be very efficient on introducing the attenuation to the light, while the other arm (arm 20) of the MZI with PIN junction will be efficient on generating the phase modulation with small parasitic attenuation.

Once this asymmetric MZI in FIG. 1 is constructed, one can design an algorithm to achieve almost unlimited extinction ratio during the switching operation. Assuming the input and output 3-dB couplers 3,4 are perfectly balanced (in real application, an un-perfect balanced 3-dB coupler can also be compensated with a modified algorithm), as well as the static loss and optical length of the two arms 19,20 of the MZI, the output of the device in FIG. 1 can be derived as the follows, $$\begin{cases} B1 = \frac{1}{\sqrt{2}}A \\ B2 = -j\frac{1}{\sqrt{2}}A \end{cases} \quad (4)$$

are the output of the input 3-dB coupler 3, where B1 is corresponding to input amplitude of the arm 19 and B2 is corresponding to input amplitude of the arm 20. And, $$\begin{cases} C1 = B1 \cdot \exp[-\Delta\alpha(N_{epn}, N_{hpn}, N_s) \cdot L_{pn}] \cdot \\ \quad \exp[-j \cdot \Delta\beta(N_{epn}, N_{hpn}) \cdot L_{pn}] \\ C2 = B2 \cdot \exp[-\Delta\alpha(N_{epin}, N_{hpin}, 0) \cdot L_{pin}] \cdot \\ \quad \exp[-j \cdot \Delta\beta(N_{epin}, N_{hpin}) \cdot L_{pin}] \end{cases} \quad (5)$$

are the light-wave fields at the end of the two arms of the MZI. C1 is for PN junction arm 19, and C2 is for the PIN junction arm 20. And then, the output of the device in FIG. 1 at the output ports 53, 54 of the output 3-dB coupler 4, can be described by the following expression (6), $$\begin{cases} D1 = \frac{1}{\sqrt{2}}C1 - j\frac{1}{\sqrt{2}}C2 \\ D2 = -j\frac{1}{\sqrt{2}}C1 + \frac{1}{\sqrt{2}}C2 \end{cases} \quad (6)$$

Where, D1 is the output of the port 53 and D2 is the output of the port 54. In the expression (5), the item $-\Delta\alpha(N_{epn}, N_{hpn}, N_s) \cdot L_{pn}$ is the attenuation introduced by the arm 19, in which the $L_{pn}$ is the length of the PN junction and $\Delta\alpha$ is the attenuation constant determined by expression (1), where the $N_{epn}$, $N_{hpn}$, and $N_s$ are the injected electron density, hole density, and background ion density respectively. The item $-j\cdot\Delta\beta(N_{epin}, N_{hpin})\cdot L_{pin}$ is the phase modulation introduced by the arm 20, and the $\Delta\beta$ is the phase propagation constant modulation caused by the index modulation expressed by the expression (2). And $N_{epin}$ and $N_{hpin}$ are the injected carrier densities and $L_{pin}$ is the length of the PIN junction 200 respectively.

Without any carrier injection to either arm, the device in FIG. 1 is at the CROSS state, where the output of the output ports 53, 54 could be described as expression (7).

$$\begin{cases} D1 = 0 \\ D2 = A \end{cases} \quad (7)$$

Here, we ignore the static loss of the 3-dB couplers and the MZI's arms. To bring the device into the BAR state, one injects carriers into the arm 20 to introduce $\pi$ phase shift. If no carrier injection into the PN junction 190, the C1 and C2 in expression (5) will have un-balanced power level due to the item of $-\Delta\alpha(N_{epin}, N_{hpin}, 0)\cdot L_{pin}$. For instance, if one introduce $5\times10^{17}$ cm^-3 carrier density modulation for both electrons and holes in PIN junction 200, the extinction ratio D1/D2 will be less than 30 dB.

The compensation injection into the PN junction 190 is calculated by the following iteration process: 1) introduce an attenuation along the PN junction arm 19 and make it equal to the attenuation caused by $-\Delta\alpha(N_{epin}, N_{hpin}, 0)\cdot L_{pin}$; 2) then increase the injection into the PIN junction 200 slightly to balance the phase item of the magnitude arm $-j\cdot\Delta\beta(N_{epn}, N_{hpn})\cdot L_{pn}$; 3) then modify the PN junction injection to make the attenuation balanced again; 4) repeat the step 1)-3) until both required carrier injection converged. With $2\times10^{18}$ cm^-3 background ion density in the PN junction 190 area, only extra 23.5% percent carrier injection into the PIN junction 200 is required, to improve the extinction ratio of the BAR state up to almost infinity, if no other un-perfections need to be considered.

Figure 2:
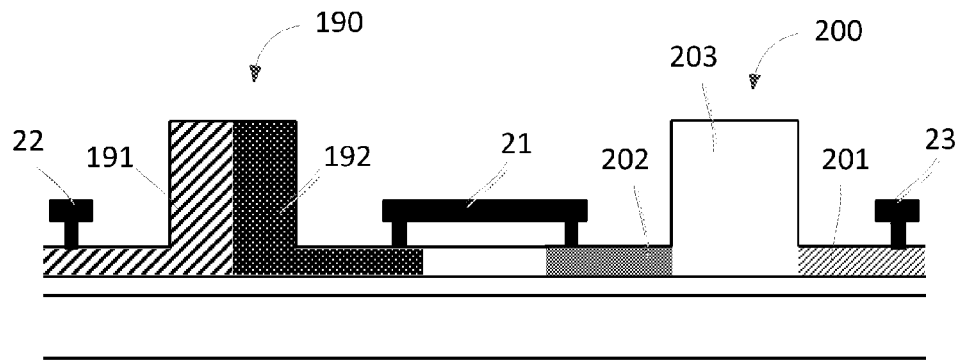
FIG. 2 is a cross-sectional view taken along line 1-1 of the optical waveguide switch depicted in FIG. 1.

FIG. 2 is a cross-sectional view taken along line 1-1 of the optical waveguide switch depicted in FIG. 1. In FIG. 2, PN junction 190 is a waveguide capacitor formed by a ridge waveguide, which comprises the P doping area 191 and the N doping area 192. Also, PIN junction 200 is a waveguide capacitor formed by a ridge waveguide, which comprises the N doping area 202, intrinsic area 203 and the P doping area 201. The capacitance is the junction capacitance of PN or PIN. Please note that the background ion density of the PN junction 190 is higher than that of the PIN junction 200.

Figure 3:
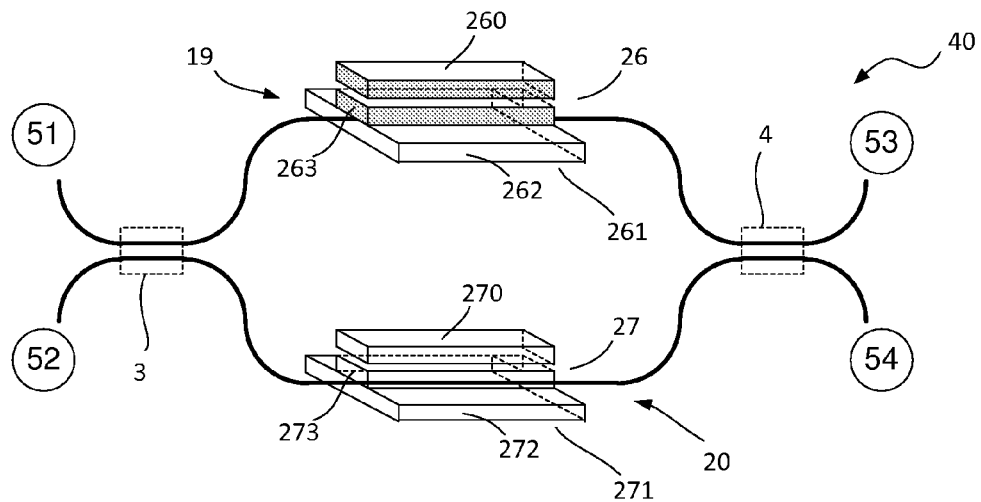
FIG. 3 is a simplified diagram depicting an optical waveguide switch with an asymmetric MZI using ridge-loaded waveguide capacitor in accordance with this disclosure.

The methodology of the optical waveguide switch using the asymmetric MZI invented here can have more varieties of implementation (or embodiments). FIG. 3 is a simplified diagram depicting an optical waveguide switch asymmetric MZI using ridge-loaded waveguide capacitor in accordance with this disclosure.

Waveguide capacitor is a terminology to describe the optical waveguide inside which there is a capacitor to store the charges (the electrons or holes in semiconductor). It is a basic building block for all electro-optic devices using free carrier dispersion effect, as described in U.S. Pat. No. 7,817,881. Actually, the previous described PN junction and PIN junction built in optical waveguides are also two types of waveguide capacitors where the capacitance itself is the junction capacitance of PN or PIN.

As seen in FIG. 3, in this embodiment, the optical waveguide switch 40 comprises an asymmetric MZI using waveguide capacitors. In contrast to the structure in FIG. 1, the abrupt PN junction and the PIN junction are replaced by waveguide capacitors. In FIG. 3, the waveguide capacitor 26 is a ridge-loaded waveguide capacitor structure that is constructed by loading a semiconductor film 260 on top of a regular ridge waveguide 261 (assuming it is a silicon-on-insulator waveguide). The ridge waveguide 261 comprises silicon slab 262 and the silicon ridge 263. In the same way, the waveguide capacitor 27 is formed by loading a semiconductor film 270 on top of a regular ridge waveguide 271. The ridge waveguide 271 comprises silicon slab 272 and the silicon ridge 273. If the loaded semiconductor is a poly-silicon, and the thin dielectric film sandwiched in-between (not depicted) is the gate-oxide layer, the capacitance that this waveguide capacitor utilized is actually MOS capacitor in a regular CMOS process. On the arm 19 (the magnitude modulation arm), both loaded semiconductor film 260 and the silicon ridge 263 will be heavily doped with background ion density. Please note that it is done by alternatively applying P- and N-type doping and the volume must have low net implant density to avoid heavy free-carrier attenuation when there is no electrical voltage applied. On the arm 20 (the phase modulation arm), the loaded semiconductor film 270 and the silicon ridge 273 will be lightly doped to ensure little background ion density.

The net doping density on both arms needs also to be great enough to ensure the conductivity of the material so that the waveguide capacitor 26 and 27 can be charged or discharged in a time short enough. The net doping density on the loaded semiconductor and the silicon underneath can be non-uniform, e.g., the center portion (corresponding to the waveguide ridge) can have less net density, while the side portion (on the side of the waveguide ridge) can have more net density, in order to satisfy the requirement of the high conductivity and low optical attenuation of the waveguide.

Figure 4:
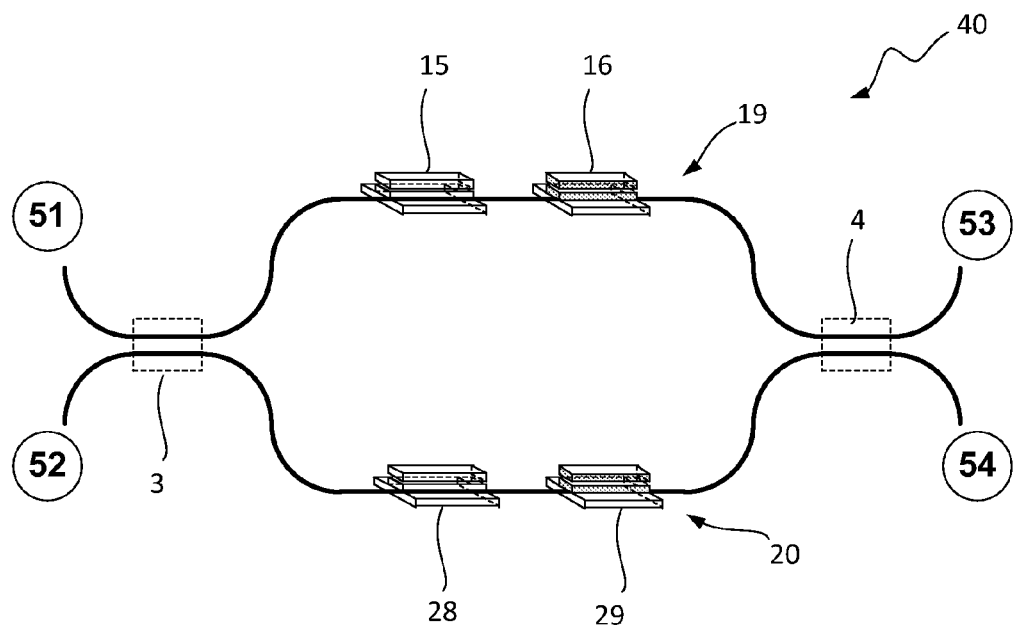
FIG. 4 is a schematic diagram of an optical waveguide switch with phase and magnitude sections in each arm of the MZI in accordance with this disclosure.

The invented method can also have other different types of configurations. FIG. 4 is a schematic diagram of an optical waveguide switch with the phase and the magnitude sections in both arms of the MZI in accordance with this disclosure.

In this embodiment as shown in FIG. 4, the physical structures of two arms of the MZI are actually the same. Each arm of the MZI has both phase section and magnitude section. Arm 19 has the phase section 15 and the magnitude section 16, while arm 20 comprises the phase section 28 and the magnitude section 29. As described above referring to the waveguide capacitors in FIG. 3, the phase section 15 has the waveguide capacitor structured the same as the waveguide capacitor 27 in FIG. 3, and the magnitude section 16 structured the same with the waveguide capacitor 26 in FIG. 3. Please note that on the arm 20 in FIG. 4, the phase section 28 has the same structure with the phase section 15 and the magnitude section 29 is of the same structure with the magnitude section 16.

However, the device in FIG. 4 will be operated in an asymmetric manner: the phase sections 15 and 28 of the two arms (also referred to as north and south arm) will be operated differentially, i.e., when the phase section 15 of the north arm 19 has a carrier injection, the phase section 28 of the south arm 20 will have a carrier extraction, and vice versa. The magnitude section 16 and 29 afterwards will be used to compensate the parasitic attenuation caused by the operation in the phase section 15 and 28. The detailed algorithm of the operation can be derived using a similar procedure described earlier in this disclosure.

Various aspects of the disclosure have been described. These and other aspects are within the scope of the following claims.

The invention claimed is:

1. An optical waveguide switch, comprising,
   a waveguide Mach-Zehnder interferometer, wherein the Mach-Zehnder interferometer has a first arm, a second arm, two input ports, and two output ports;
   a phase section on the first arm of the Mach-Zehnder interferometer, the said phase section is a length of optical waveguide capacitor;
   a magnitude section on the second arm of the Mach-Zehnder interferometer, the said magnitude section is a length of optical waveguide capacitor that is different from the waveguide capacitor of the phase section;
   the mobility of the carriers in the waveguide capacitor's charge storage volume is lower in the waveguide capacitor of the magnitude section than that of the phase section.

2. The said optical waveguide switch of claim 1, wherein the background ion density doped in the waveguide capacitor's charge storage volume is higher in the waveguide capacitor of the magnitude section than that of the phase section.

3. The said optical waveguide switch of claim 1, wherein the phase section is on the first arm only and the magnitude section is on the second arm only, the said arm with phase section is called phase arm, and the said arm with magnitude section is called magnitude arm.

4. The said optical waveguide switch of claim 3, wherein the said waveguide capacitor in the said phase section is a PIN junction waveguide capacitor, and the said waveguide capacitor in the said magnitude section is a PN junction waveguide capacitor.

5. The said optical waveguide switch of claim 3, wherein the said waveguide capacitor is a ridge-loaded waveguide capacitor, the said ridge loaded waveguide capacitor comprises a semiconductor film loaded on top of a silicon-on-insulator ridge waveguide, a thin dielectric film exists between the loaded film and the ridge.

6. An optical waveguide switch, comprising,
   a waveguide Mach-Zehnder interferometer, wherein the Mach-Zehnder interferometer has a first arm, a second arm, two input ports, and two output ports;

a phase section and a magnitude section on both the first arm and the second arm of the Mach-Zehnder interferometer;

the said phase section is a length of optical waveguide capacitor;

the said magnitude section is a length of optical waveguide capacitor that is different from the waveguide capacitor of the phase section;

the mobility of the carriers in the waveguide capacitor's charge storage volume is lower in the waveguide capacitor of the magnitude section than that of the phase section.

7. The said optical waveguide switch of claim 6, wherein the background ion density doped in the waveguide capacitor's charge storage volume is higher in the waveguide capacitor of the magnitude section than that of the phase section.

8. The said optical waveguide switch of claim 6, wherein the said waveguide capacitor in the said magnitude section is a PN junction waveguide capacitor, and the said waveguide capacitor in the said phase section is a PIN junction waveguide capacitor.

9. The said optical waveguide switch of claim 6, wherein the said waveguide capacitor is a ridge-loaded waveguide capacitor, the said ridge loaded waveguide capacitor comprises a semiconductor film loaded on top of a silicon-on-insulator ridge waveguide, a thin dielectric film exists between the loaded film and the ridge.

\* \* \* \* \*